(12) United States Patent  (10) Patent No.: US 8,095,001 B2
Sasaki  (45) Date of Patent: Jan. 10, 2012

(54) PORTABLE EQUIPMENT WITH HEAT RADIATING STRUCTURE

(75) Inventor: Yoshikazu Sasaki, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 51 days.

(21) Appl. No.: 12/198,585

(22) Filed: Aug. 26, 2008

(65) Prior Publication Data

US 2009/0060492 A1  Mar. 5, 2009

(30) Foreign Application Priority Data

Aug. 27, 2007  (JP) ................. 2007-219209

(51) Int. Cl.
*G03B 17/02* (2006.01)
*H04N 5/225* (2006.01)
(52) U.S. Cl. ......... 396/535; 396/539; 396/542; 348/376
(58) Field of Classification Search .......... 396/535, 396/419, 542, 539; 348/373–376
See application file for complete search history.

(56) References Cited

U.S. PATENT DOCUMENTS

| | | | |
|---|---|---|---|
| 5,483,418 A | 1/1996 | Hosoi | |
| 5,777,844 A | 7/1998 | Kiefer | |
| 7,031,165 B2 | 4/2006 | Itabashi et al. | |
| 7,710,728 B2 * | 5/2010 | Arisaka et al. | 361/719 |
| 2006/0098117 A1 | 5/2006 | Kajihara et al. | |
| 2008/0259537 A1 | 10/2008 | Arisaka et al. | |

FOREIGN PATENT DOCUMENTS

| | | |
|---|---|---|
| JP | 05-226853 A | 9/1993 |
| JP | 11-187095 A | 7/1999 |
| JP | 2000-241872 A | 9/2000 |
| JP | 2001-125191 A | 5/2001 |
| JP | 2001-194712 A | 7/2001 |
| JP | 2005-019711 A | 1/2005 |
| JP | 2006-140673 A | 6/2006 |
| JP | 2006-211091 A | 8/2006 |
| JP | 2006-253196 A | 9/2006 |
| JP | 2007-121593 A | 5/2007 |

OTHER PUBLICATIONS

Japanese Office Action dated May 24, 2011, issued in corresponding Japanese Patent Application No. 2007-219209.
Japanese Office Action dated Oct. 18, 2011, issued in corresponding Japanese Patent Application No. 2007-219209.

* cited by examiner

*Primary Examiner* — Rochelle-Ann J Blackman
(74) *Attorney, Agent, or Firm* — Westerman, Hattori, Daniels & Adrian, LLP

(57) ABSTRACT

In a digital camera implementing the present invention, a metal tripod seat is arranged on a cabinet, a circuit part that generates heat is accommodated in the cabinet, the circuit part is connected with the tripod seat in a heat conducting manner, and a cover strip made of resin extending from the cabinet covers the tripod seat. The tripod seat is arranged at one end of the cabinet, and the outer surface of the cabinet has a projection formed at a site facing the circuit part, and forms a heat radiating space allowing flow of heat to the other end of the cabinet with the circuit part.

14 Claims, 5 Drawing Sheets

US 8,095,001 B2

PORTABLE EQUIPMENT WITH HEAT RADIATING STRUCTURE

CROSS REFERENCE OF RELATED APPLICATION

This application claims priority from Japanese Patent Application 2007-219209 filed on Aug. 27, 2007.

BACKGROUND OF THE INVENTION

1. Field of the Invention

The present invention relates to portable equipment having a heat radiating structure, specifically, to portable equipment such as digital camera having a structure for escaping internal heat to the outside.

2. Description of the Related Art

FIG. 7 is a view showing a side surface of a digital camera having a heat radiating structure of the prior art in a partially cut-out manner. As well-known, circuit parts (6) such as CCD and LSI are arranged in a cabinet (1) including a lens barrel (11). The circuit parts (6) are attached to a metal circuit holding plate (66) by way of a wiring substrate (65). A metal tripod seat (3) formed with a screw hole (32) for a tripod (not shown) is arranged at the lower surface of the cabinet (1), and the circuit holding plate (66) is connected to the tripod seat (3). The heat generated from the circuit part (6) is transmitted to the tripod seat (3) through the circuit holding plate (66), and released to the exterior of the cabinet (1) from the lower surface of the tripod seat (3). The interior of the cabinet (1) is thereby prevented from becoming too hot by the generated heat from the circuit part (6).

The fingers of the user sometimes touch the lower surface of the cabinet (1) when the cabinet (1) is held with one hand. When the fingers touch the lower surface of the tripod seat (3), the user feels hot and uncomfortable, and furthermore, may drop the gripped cabinet (1).

The present invention provides portable equipment having a heat radiating structure in which the hotness felt by the user is alleviated even if the fingers of the user touch the heat radiating part.

The present invention also provides portable which radiates heat generated from the circuit part from a part other than a metal connection member.

SUMMARY OF THE INVENTION

In portable equipment of the present invention, a heat generating body such as circuit part is attached to a metal connection member, and the connection member is attached to a cabinet. The heat generating body is connected with the connection member in a heat conducting manner. A cover strip made of resin is extended so as to face the connection member at an end on the connection member side of the cabinet, and covers an exposed surface of the connection member.

The connection member is arranged at one end of the cabinet in the interior of the cabinet, and the cabinet forms a heat radiating space allowing flow of heat to the other end of the cabinet with the heat generating body.

Since the cover strip made of resin is placed over the metal connection member, the fingers of the user gripping the cabinet contact the cover strip but do not touch the connection member. Thus, during use, the fingers of the user merely touch the cover strip, and heat transmitted from the heat generating body to the connection member will not be directly transmitted to the user thereby giving an unpleasant feeling to the user.

The heat from the heat generating body flows and spreads not only to the connection member but also to the other end of the cabinet through the radiating space, that is, to the end on the side opposite to the connection member in the cabinet. The connection member is thereby prevented from being overheated.

DETAILED DESCRIPTION OF THE PREFERRED EMBODIMENTS

One example of the present invention will be described using the drawings.

Figure 1:
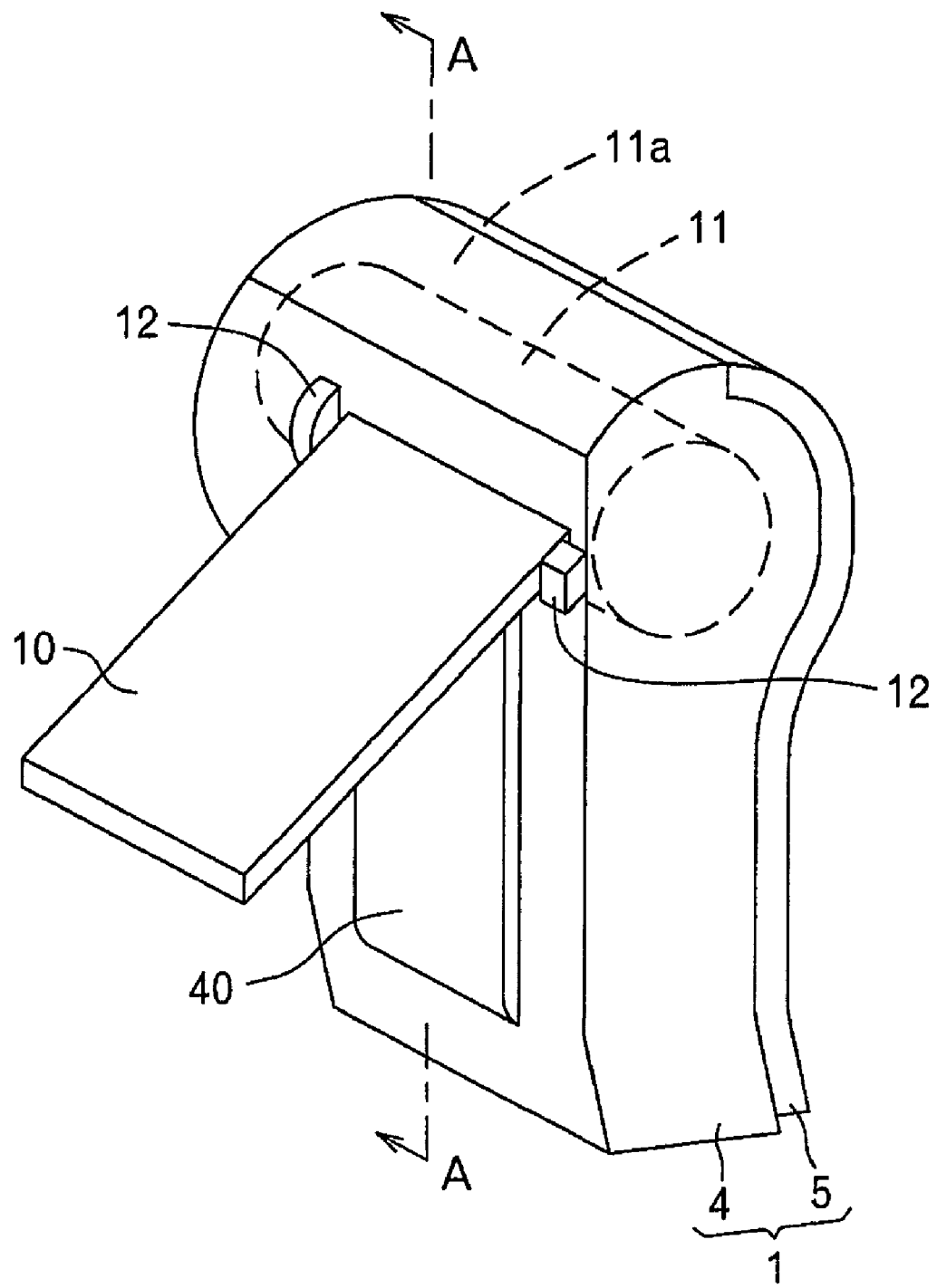
FIG. 1 shows a perspective view of a digital camera according to an example of the present invention.
Figure 2:
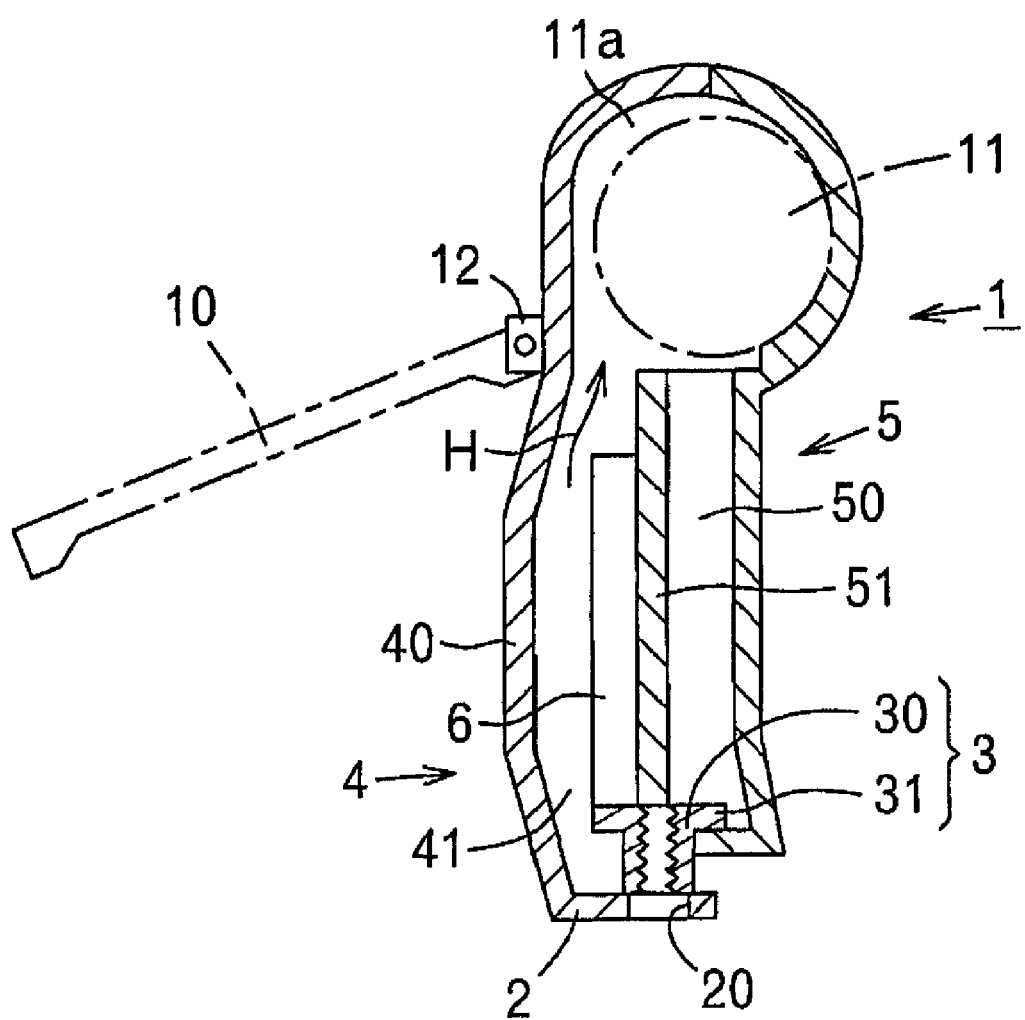
FIG. 2 shows a view taken along a vertical plane including line A-A of FIG. 1.

FIG. 1 is a perspective view of a camera equipment related to the present example, more specifically, a digital camera; and FIG. 2 is a view taken along a vertical plane including line A-A of FIG. 1. A cabinet (1) is configured by horizontally overlapping a first cabinet half-body (4) and a second cabinet half-body (5), which are both made of synthetic resin, where a lens barrel (11) is accommodated in a space (11a) formed at an upper end of the half-bodies (4), (5). A display plate (10), which is a liquid crystal panel, is arranged on the exterior of the first cabinet half-body (4) so as to be pivotable upward and downward, a basal end of which display plate (10) being pivotally supported by bearings (12), (12) arranged at the upper end of the first cabinet half-body (4). A projection (40) is formed on the first cabinet half-body (4) at an area to be covered by the display plate (10).

The display plate (10), which is the liquid crystal panel, is not limited to pivoting with only one axis as a center, for example, to pivot with the bearings (12), (12) as the center. After pivoting the display plate (10) upward, the rear surface of the display plate (10) may be turned with two axes as the center so that the rear surface of the display plate (10) faces an optical axis direction of the lens barrel (11).

As shown in FIG. 2, a battery chamber (50) accommodating a battery is formed below the lens barrel (11) in the second cabinet half-body (5). The circuit part (6) such as CCD or LSI is arranged on the rear surface of an inner wall (51) of the battery chamber (50) by way of a circuit substrate (not shown). The circuit part (6) faces the back surface of the projection (40). A heat radiating space (41) or a gap is formed between the circuit part (6) and the inner side of the projection (40), and the upper end of the heat radiating space (41) is connected to a space (11a) accommodating the lens barrel (11) therein. The tripod seat (3) made of metal is arranged at the lower end of the second cabinet half-body (5), and the lower end of the circuit part (6) is contacted to the tripod seat (3).

The generated heat from the circuit part (6) flows into the tripod seat (3), but one part rises through the heat radiating space (41) and flows into the space (11a), as shown with a reference numeral H. In the camera equipment of the subject invention, the generated heat from the circuit part (6) escapes not only to the tripod seat (3) but also to the upper end of the cabinet (1) through the heat radiating space (41). All the heat is thus prevented from being transmitted to the tripod seat (3), and the tripod seat (3) is prevented from being overheated. The projection (40) does not need to be formed if the heat radiating space (41) can be formed to a sufficient size.

Figure 3:
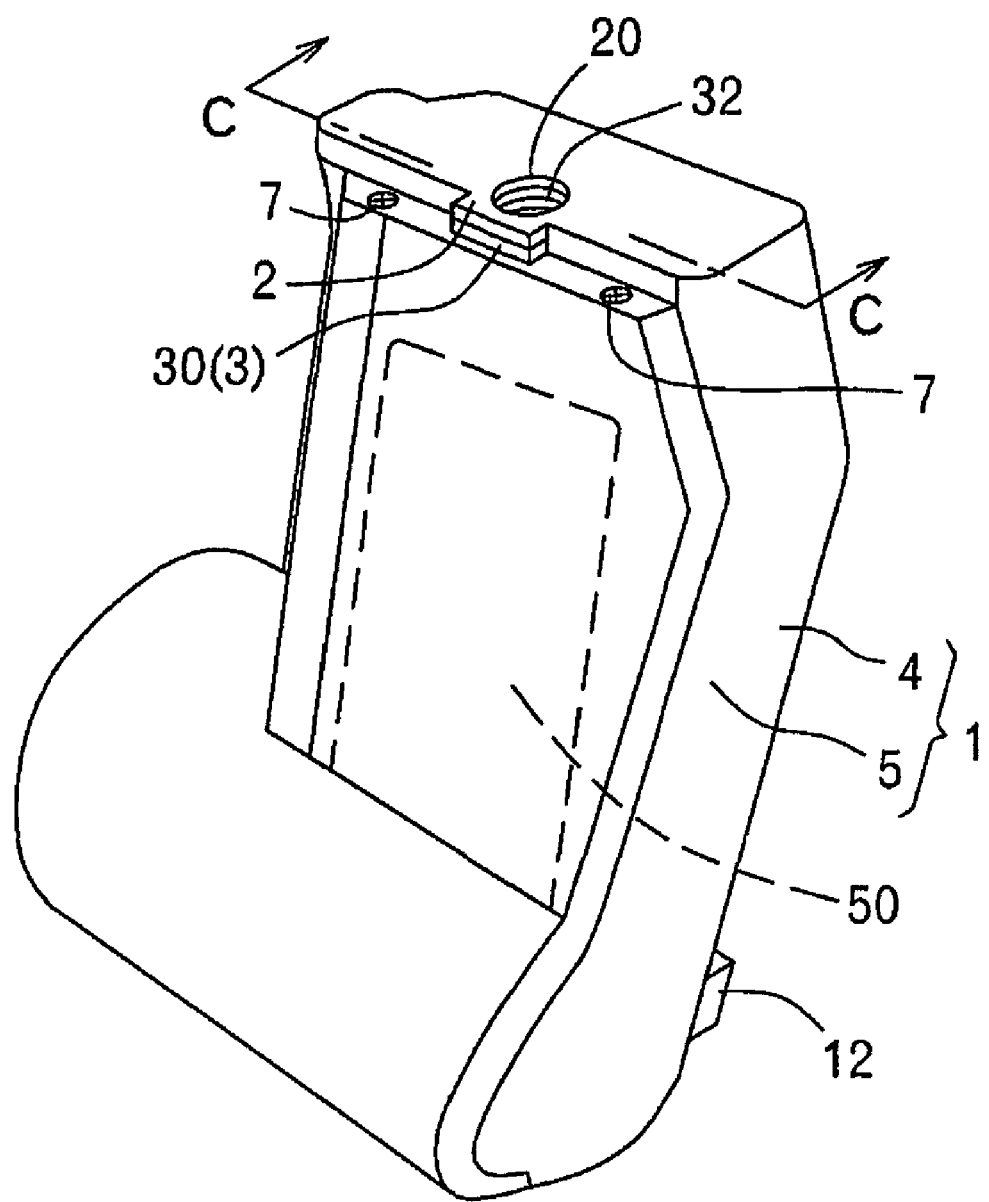
FIG. 3 shows a perspective view seen from a second cabinet half-body side with the digital camera according to the example of the present invention turned upside down.
Figure 4:
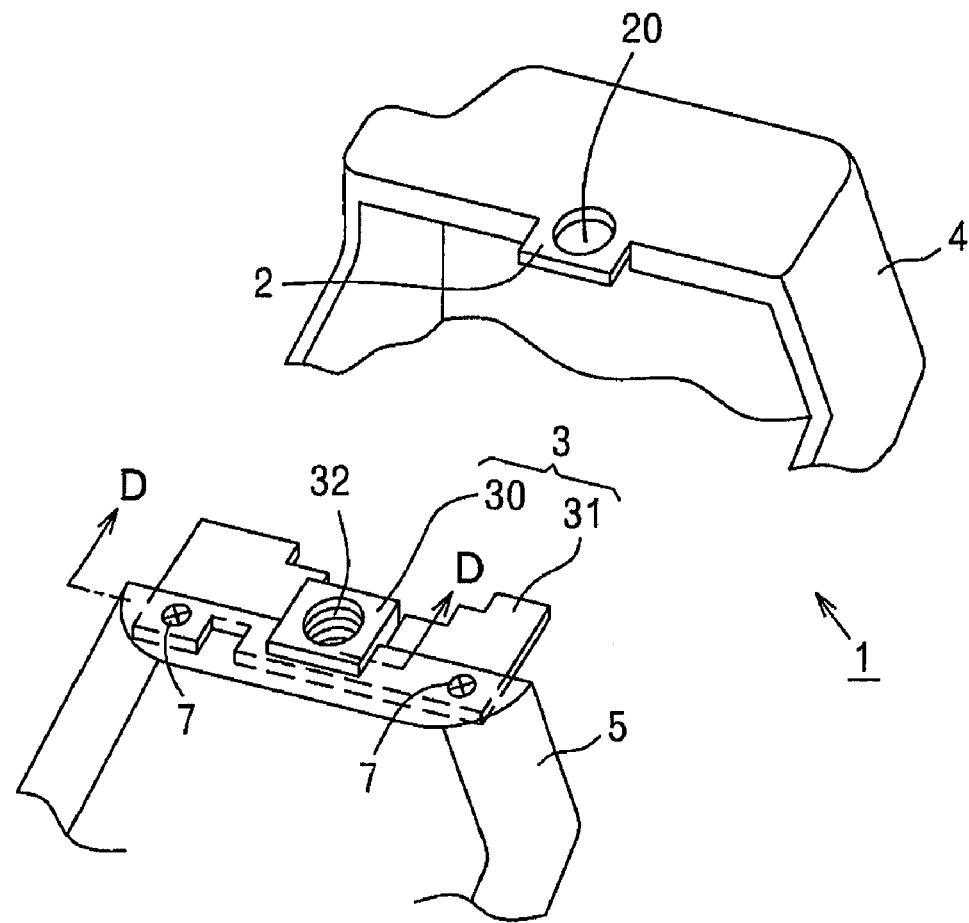
FIG. 4 shows a perspective view showing the first cabinet half-body and the second cabinet half-body in an exploded manner.
Figure 5:
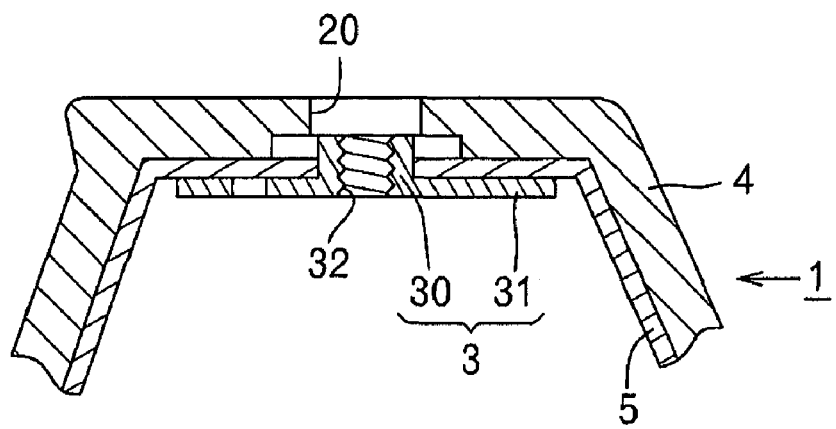
FIG. 5 shows an enlarged cross-sectional view of the first cabinet half-body of FIG. 3 taken along a vertical plane including line C-C.

FIG. 3 is a perspective view seen from the second cabinet half-body side with the digital camera turned upside down; FIG. 4 is a perspective view showing the first cabinet half-body (4) and the second cabinet half-body (5) in an exploded manner; and FIG. 5 is an enlarged cross-sectional view of the first cabinet half-body (4) of FIG. 3 taken along a vertical plane including line C-C.

The tripod seat (3) arranged at the bottom surface of the second cabinet half-body (5) is formed by die cast molding metal. The tripod seat (3) integrally includes a flat plate (31) which contacts the back side of the bottom surface of the second cabinet half-body (5), and a projection (30) which projects out from the flat plate (31), the projection (30) being formed with a first screw hole (32) to which a screw passed through the tripod seat is screw-fitted.

A cover strip (2) for covering the upper surface of the projection (30) projects out from the first cabinet half-body (4), and such cover strip (2) is made of synthetic resin integrally with the first cabinet half-body (4). A pass-through hole (20) for exposing the first screw hole (32) is opened in the cover strip (2).

As shown in FIG. 2, one part of the circuit part (6) is contacted the tripod seat (3), and the heat of the circuit part (6) is transmitted to the tripod seat (3) and radiated from the tripod seat (3). As the cover strip (2) extending from the first cabinet half-body (4) covers the projection (30), the fingers of the user touch the cover strip (2) and do not directly touch the projection (30). The heat is thereby avoided from being directly transmitted to the user gripping the cabinet (1) and giving an uncomfortable feeling to the user. The user feeling hotness thus will not drop the gripped cabinet (1).

Figure 6:
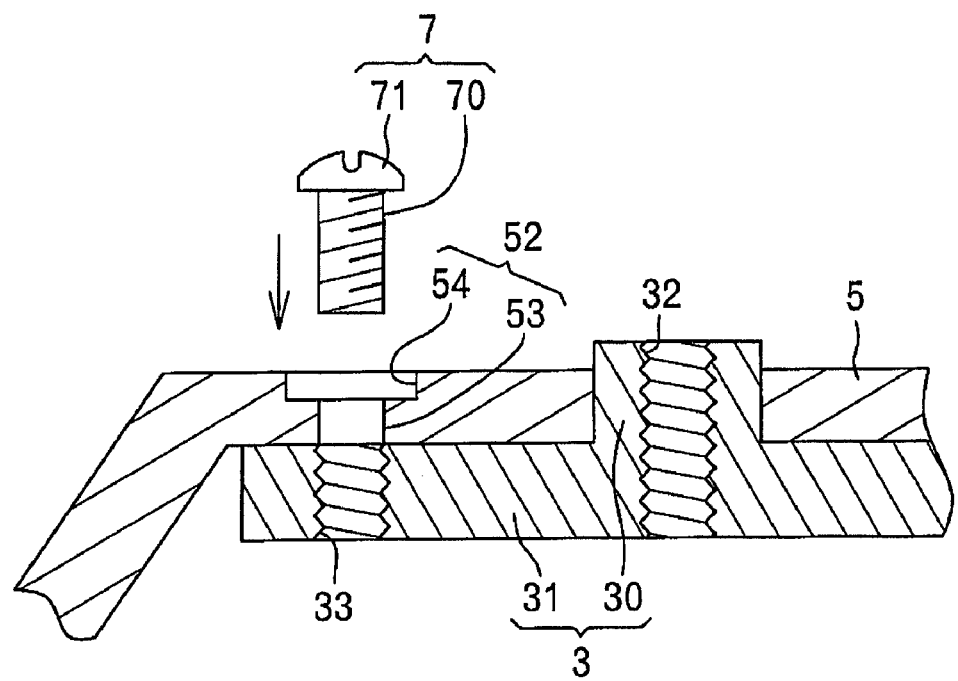
FIG. 6 shows an enlarged cross-sectional view taken along a plane including line D-D of FIG. 4.
Figure 7:
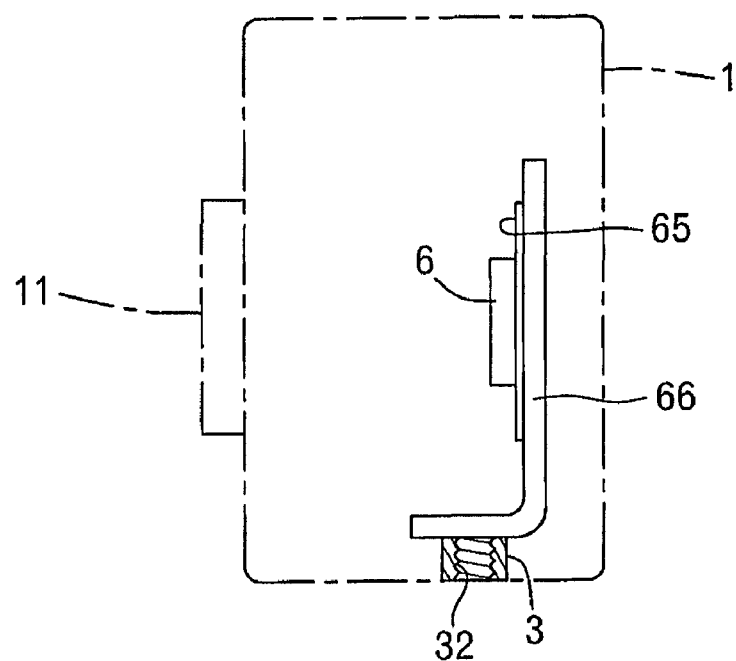
FIG. 7 shows a view showing a side surface of a digital camera having a heat radiating structure of the prior art in a partially cut-out manner.

The flat plate (31) of the tripod seat (3) is screw-fitted (7) to the back side of the bottom surface of the second cabinet half-body (5) (see FIG. 4). FIG. 6 is an enlarged cross-sectional view taken along a plane including line D-D of FIG. 4.

A second screw hole (33) is opened at the end of the flat plate (31), and a hole with step (52) to be aligned with the second screw hole (33) is opened in the second cabinet half-body (5). A locking screw (7) is screw-fitted to the second hole (33) through the hole with step (52) from the outer side of the second cabinet half-body (5), and the tripod seat (3) is attached to the second cabinet half-body (5).

The hole with step (52) is formed by connecting a small hole (53) through which a screw part (70) of the locking part (7) passes, and a large hole (54) to be fitted with a heat part (71) of the locking screw (7). The head part (71) of the locking screw (7) is accommodated in the large hole (54) and does not project out from the upper surface of the second cabinet half-body (5) when the locking screw (7) is fitted in the second screw hole (33). Thus, the fingers of the user gripping the cabinet (1) will not touch the locking screw (7). Since the locking screw (7) is fastening the metal tripod seat (3), the generated heat from the circuit part (6) is also transmitted to the locking screw (7) by way of the tripod seat (3). However, since the fingers of the user do not touch the locking screw (7), the fingers will not touch the locking screw (7) and feel hot.

The present example has the following features.

1. The fingers of the user gripping the cabinet (1) touch the cover strip (2) since the resin cover strip (2) covers the metal tripod seat (3). The heat transmitted from the circuit part (6) to the tripod seat (3) thus is not directly transmitted to the user, and will not give an uncomfortable feeling to the user.

2. Since the fingers of the user also do not touch the locking screw (7), the heat transmitted from the circuit part (6) to the locking screw (7) through the tripod seat (3) is not directly transmitted to the user, and will not given an uncomfortable feeling to the user.

3. The heat from the circuit part (6) is not only radiated to the tripod seat (3) but is also radiated to the upper end of the cabinet (1) through the heat radiating space (41), that is, the end on the side opposite to the end arranged with the tripod seat (3) in the cabinet (1). The tripod seat (3) is thereby prevented from being overheated.

The digital camera has been described as portable equipment in this example, but is not limited thereto, and merely needs to be an equipment in which a metal member for heat radiation is exposed to the cabinet.

The circuit part (6), which is a heat generating body, merely needs to be connected to the tripod seat (3), which is a connection member, in a heat conducting manner, and does not necessarily need to be structurally contacted. In other words, the circuit part and the tripod seat may be structurally spaced apart, that is, a gap may be provided as long as radiated heat or emitted heat can be conducted.

What is claimed is:

1. Portable equipment, wherein
a heat generating body is accommodated in a cabinet;
a metal connection member for the heat generating body is arranged on the cabinet;
the heat generating body is connected with the connection member in a heat conducting manner; and
a cover strip made of resin extended from the cabinet covers the connection member,
wherein the metal connection member is in direct contact with the heat generating body.

2. The portable equipment according to claim 1, wherein the connection member is attached to the cabinet by a locking screw, a head part of the locking screw being fitted to a hole formed in the cabinet and being positioned on an inner side of an upper surface of the cabinet.

3. The portable equipment according to claim 1, wherein the cover strip directly contacts the metal connection member.

4. The portable equipment according to claim 1, wherein said metal connection member includes a hole designed to accommodate a screw.

5. The portable equipment according to claim 4, wherein said metal connection member is homogenous.

6. The portable equipment according to claim 5, wherein said heat generating body directly contacts a top surface of the T shaped metal connection member.

7. The portable equipment according to claim 1, wherein said metal connection member has a T shape.

8. The portable equipment according to claim 1, wherein a battery chamber is adjacent to said metal connection member.

9. The portable equipment according to claim 1, wherein two half-body cases are joined at said metal connection member.

10. Portable equipment, wherein
a heat generating body is accommodated in a cabinet;

a metal connection member for the heat generating body is arranged at one end of the cabinet;

the heat generating body is connected with the connection member in a heat conducting manner; and a heat radiating space allowing flow of heat to the other end of the cabinet is formed with the heat generating body in the cabinet, wherein an outer surface of the cabinet has a projection formed at a site facing the heat generating body, and forms the heat radiating space in an interior of the cabinet, wherein the metal connection member is in direct contact with the heat generating body.

11. Portable equipment, wherein a heat generating body is accommodated in a cabinet;

a metal connection member for the heat generating body is arranged on the cabinet;

the heat generating body is connected with the connection member in a heat conducting manner; and a cover strip made of resin extended from the cabinet covers the connection member; wherein the cabinet is used in a camera equipment;

the connection member is a tripod seat for attaching the cabinet to a tripod; and the heat generating body is a circuit part.

12. The portable equipment according to claim 11, wherein the connection member is attached to the cabinet by a locking screw, a head part of the locking screw being fitted to a hole formed in the cabinet and being positioned on an inner side of an upper surface of the cabinet.

13. Portable equipment, wherein a heat generating body is accommodated in a cabinet;

a metal connection member for the heat generating body is arranged at one end of the cabinet;

the heat generating body is connected with the connection member in a heat conducting manner;

a heat radiating space allowing flow of heat to the other end of the cabinet is formed with the heat generating body in the cabinet;

wherein an outer surface of the cabinet has a projection formed at a site facing the heat generating body, and forms the heat radiating space in an interior of the cabinet;

the cabinet is used in a camera equipment;

the connection member is a tripod seat for attaching the cabinet to a tripod; and the heat generating body is a circuit part.

14. The portable equipment according to claim 13, wherein the connection member is attached to the cabinet by a locking screw, a head part of the locking screw being fitted to a hole formed in the cabinet and being positioned on an inner side of an upper surface of the cabinet.

* * * * *